Jan. 21, 1964    J. G. KEENAN ETAL    3,118,276
GAS TURBINE ENGINES
Filed March 5, 1962    4 Sheets-Sheet 1
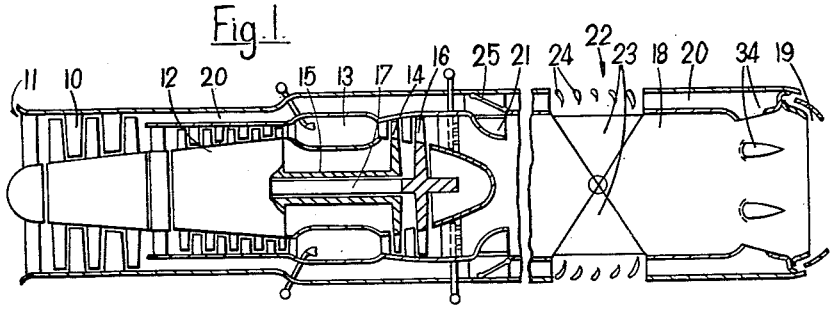
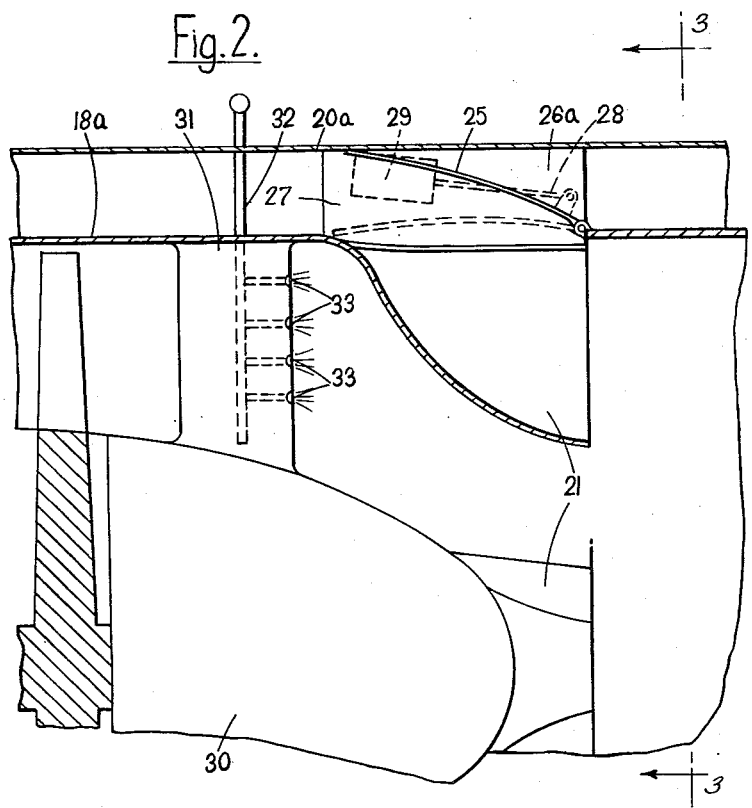
INVENTORS
John Gregory Keenan
Jack Coltsyman
John Bertram Halliday
David John Pickerell
By Cushman, Darby & Cushman
ATTORNEYS

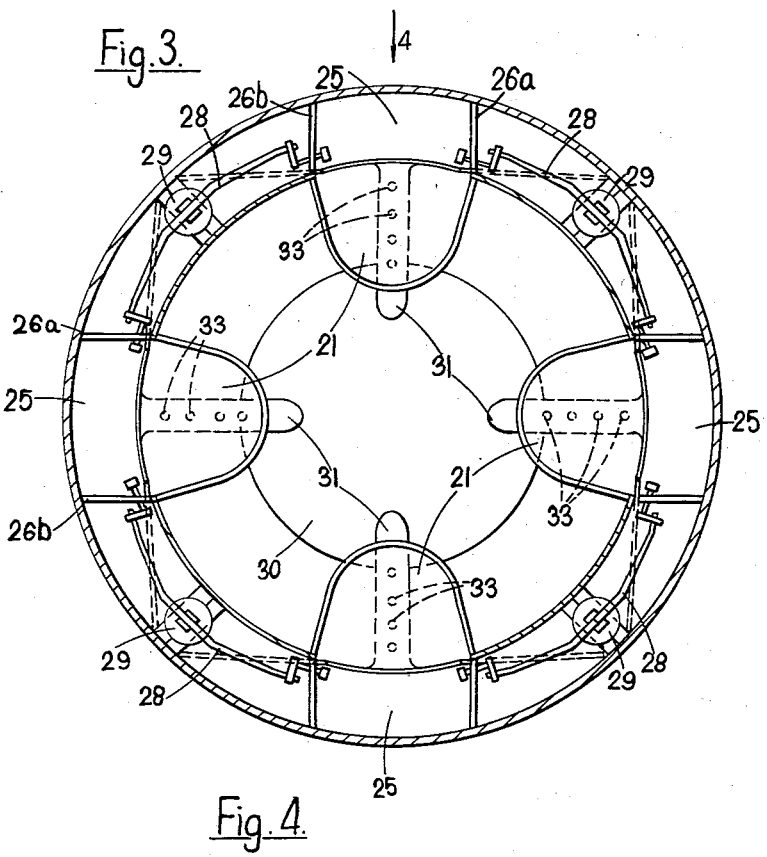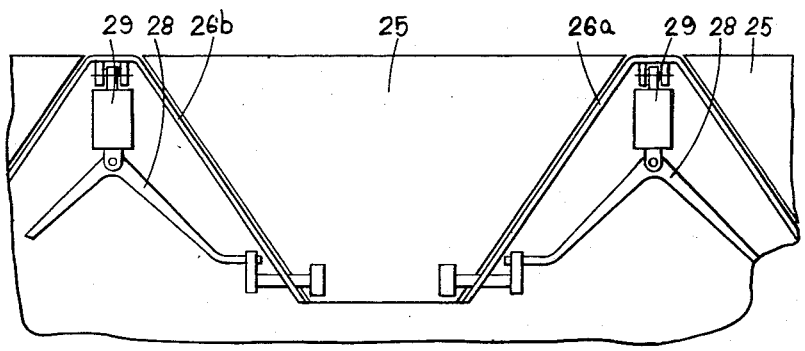

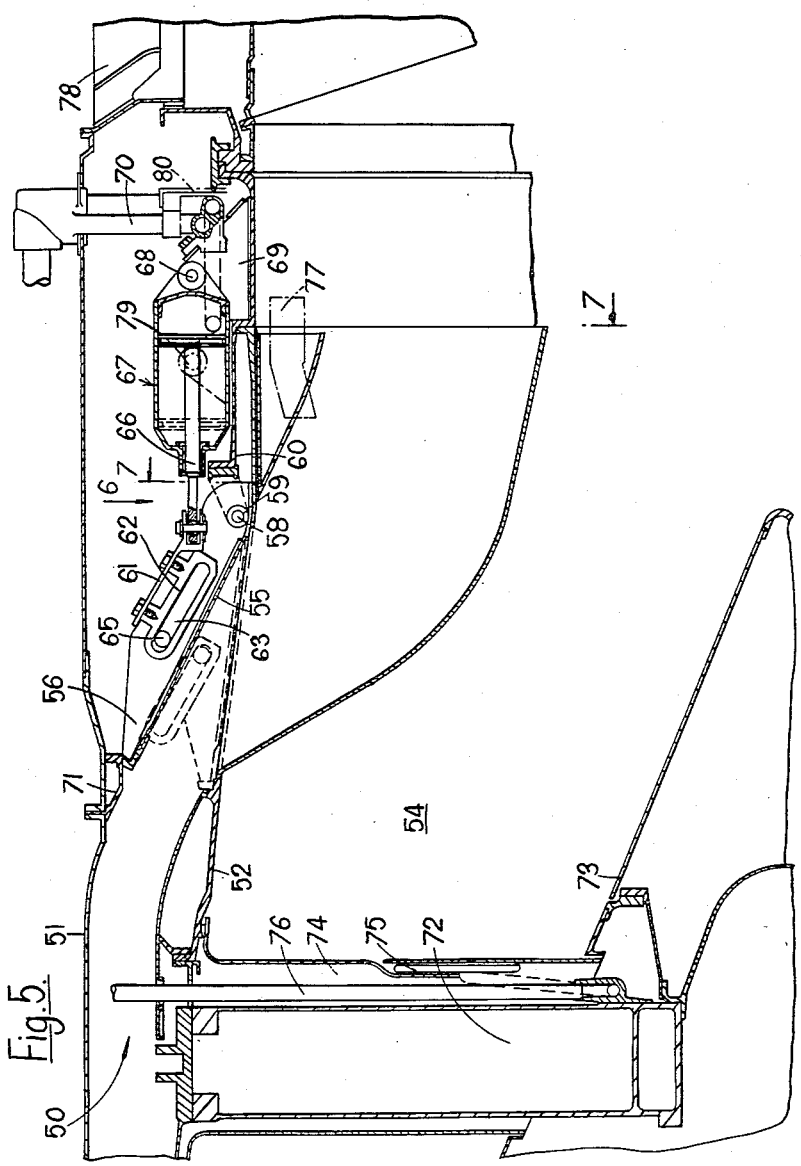

United States Patent Office 3,118,276
Patented Jan. 21, 1964

3,118,276
GAS TURBINE ENGINES
John G. Keenan, Derby, Jack Palfreyman, Tansley, near Matlock, John Bertram Holliday and David John Pickerell, Derby, England, assignors to Rolls-Royce Limited, Derby, England
Filed Mar. 5, 1962, Ser. No. 177,360
Claims priority, application Great Britain Mar. 21, 1961
14 Claims. (Cl. 60—35.6)

This invention relates to gas turbine engines and is more particularly concerned with engines of the type hereinafter referred to as "by-pass or ducted fan engines."

A by-pass engine is one which comprises a compressor system having a low pressure compressor section from which air is delivered partly to a high pressure compressor section and partly to a flow passage which by-passes the high pressure compressor section, combustion equipment receiving air compressed in the high pressure compressor section and a turbine system which receives the products of combustion from said combustion equipment, and in which the by-passed air flowing in said passage and the exhaust gases from said turbine system are passed to atmosphere through propelling nozzle means to provide propulsive thrust.

A ducted fan engine is one which includes one or more fan rotors which are driven by the rotor system of the engine and which cause air to flow through a duct surrounding the engine.

In engines used for aircraft propulsion, it is known to burn additional fuel in the exhaust gas passing from the turbine to atmosphere in order to augment the propulsive thrust of the engine, and the present invention is concerned with by-pass or ducted fan engines having additional combustion equipment for this purpose.

According to the present invention there is provided a gas turbine by-pass or ducted fan engine in which the duct, through which flows the by-pass or fan air, communicates with the exhaust gas duct downstream of the turbine or turbines through one or more mixer chutes which extend into the exhaust gas duct, each chute being provided with valve means which in one position close off the inlet to each chute and allow the by-pass or fan air to flow through the portion of the duct downstream of the chutes and in another position allows by-pass or fan air to pass into each chute so as to be mixed with the hot exhaust gases and prevents a flow through the duct downstream of the chutes, means also being provided for injecting fuel into the hot exhaust gases upstream of said chutes so that the chutes act as flame stabilising means for the reheat combustion.

Preferably the valve means prevent a flow of air through said chutes into the exhaust gas duct when reheat fuel is being injected into the exhaust gases.

During the period of reheat combustion the air in said duct may be mixed with the exhaust gases downstream of said chutes, preferably downstream of the reheat combustion zone.

Alternatively, the air in said duct may pass to atmosphere through a fixed outlet nozzle at the downstream end of said duct during reheat.

In a preferred arrangement the reheat fuel may be injected into the hot exhaust gases through fuel injection nozzles located in struts which support the exhaust cone of the engine from the outer casing.

The engine may be provided with means for deflecting the exhaust gases to atmosphere in a forward direction so as to produce a reverse component of thrust on the aircraft in which the engine is mounted.

Where gas deflecting means are provided said means are preferably located immediately downstream of said chutes, said duct extending around the means.

In one arrangement the valve means associated with each chute comprises a pivoted flap valve which is contained within a box-like chamber formed by side walls which extend between the inner and outer walls of the said duct, said side walls of each chamber converging towards each other in a downstream direction, the lower wall of said chamber being in communication with said chute.

Each flap valve is moved by one or more piston and cylinder devices located between adjacent radial walls of adjacent box-like chambers.

In another arrangement the valve means associated with each chute comprises an arcuate pivoted flap valve which extends circumferentially of the duct, through which flows the by-pass or fan air, the adjacent edges of adjacent flap valves being in overlapping relationship.

Preferably each flap valve is provided with a roller or rollers on its upper surface, said roller engaging with an inclined surface carried by or formed on an axially movable ring which encircles said flap valves.

The roller or rollers are preferably supported in bearings carried by radially extending ribs provided on the upper surface of each flap valve.

The axially movable ring is preferably caused to be moved axially of the engine by a number of piston and cylinder devices located in said duct downstream of the pivots of said flap valves.

Some or each of said mixer chutes may be provided with means for igniting the fuel supplied from the reheat fuel injection means. Preferably said ignition means comprises a catalytic igniter.

By using the chutes as stabilising means for the reheat combustion and injecting the reheat fuel through nozzles located in the struts supporting the exhaust cone full use is made of existing parts and there is no need to include extra reheat equipment, thereby giving a saving in weight, and also substantially eliminating the pressure losses normally associated with reheat equipment when inoperative.

Where means are provided for deflecting the exhaust gases to atmosphere in a forward direction, the means may be located close to the mixer chutes thereby giving a considerable saving in length as compared with an engine in which reheat stabilising means are provided in addition to the mixer chutes.

By passing the whole of the by-pass or fan air through the chutes the gas deflecting means is able to deflect the whole of the exhaust gases and by-pass or fan air and is designed to suit the diameter of the exhaust duct. Also, as the air in the by-pass duct is not directed into the chutes during reheat operation the diameter of the exhaust pipe in this region can be smaller than if the whole of the by-pass air and exhaust gases are reheated and this diameter can be designed more easily to give the required Mach number for the reheat gases.

Two embodiments of the present invention will now be described with reference to FIGURES 1 to 7 of the drawings which accompanied the specification and in which:

FIGURE 1 is a diagrammatic section through a by-pass gas turbine engine embodying the present invention, FIGURE 2 is an enlarged view of part of the engine shown in FIGURE 1 illustrating one embodiment of the present invention.

FIGURE 3 is a section taken on the line 3—3 indicated on FIGURE 2.

FIGURE 4 is a view taken in the direction of the arrow 4 indicated on FIGURE 3 with part of the outer wall broken away to show details.

FIGURE 5 is a view similar to that of FIGURE 2 showing another embodiment of the present invention.

Figure 6:
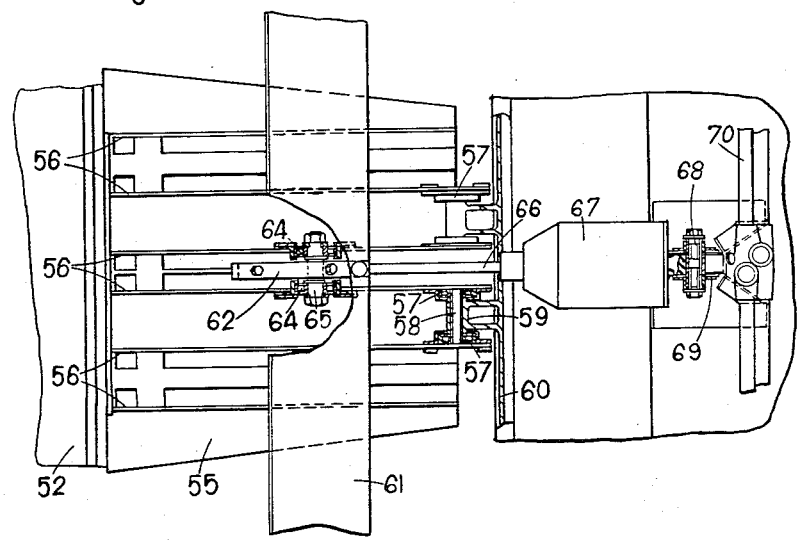
FIGURE 6 is a view taken in the direction of the arrow 6 indicated on FIGURE 5 with parts broken away to show details.

The gas turbine engine shown in FIGURE 1 comprises a low pressure compressor 10 which receives air from a forwardly facing air intake 11, a high pressure compressor 12 which receives a proportion of the air compressed in the low pressure compressor 10 and delivers to combustion equipment 13 where fuel is burned in the air, the products of combustion passing through a high pressure turbine 14 which drives the high pressure compressor 12 through shafting 15 and a low pressure turbine 16 which drives the low pressure compressor 10 through shafting 17. After driving the turbines 14, 16 the hot gases exhaust into a jet pipe 18 and are then exhausted to atmosphere through a variable propelling nozzle 19.

The low pressure compressor 12 also supplies compressed air to a by-pass duct 20 which by-passes the air around the high pressure compressor 12, combustion equipment 13 and turbines 14 and 16. Located downstream of the low pressure turbine 16 are a number of mixer chutes 21 which extend radially into the path of the hot gases passing into the jet pipe 18. Downstream of the mixer chutes 21 is a jet deflector unit 22 which comprises two movable valve members 23 which are movable from the position shown in which they prevent a gas flow into curved vanes 24 and allow the exhaust gases to flow to the propulsion nozzle 19, to a position in which they prevent a flow of exhaust gas to the nozzle 19 and allow the gases to pass through the vanes 24 and be directed to atmosphere in a forwardly direction so as to produce a breaking effect on the aircraft in which the engine is mounted.

The mixer chutes 21 are shown more clearly in FIGURES 2 to 4 and it will be seen that each chute 21 is provided with a movable valve member 25 which is pivoted at its downstream end to the jet pipe 18 and extends between a pair of side walls 26a and 26b. The side walls 26a, 26b extend from between the inner wall 18a and the outer wall 20a of the by-pass duct 20 forming a box-like structure.

The side walls 26a, 26b associated with each mixer chute 21 converge towards each other in a downstream direction so forming spaces or pockets 27. Each valve member 25 is caused to be moved by a linkage 28 which is moved by a piston and cylinder device 29.

Upstream of the mixer chutes 21 is an exhaust cone 30 which is supported from the inner wall 18a of the by-pass duct 20 by a number of radial struts 31. Each strut 31 is provided with a fuel delivery pipe 32 having outlet nozzles 33 formed in the trailing edge of the struts 31.

During normal operation of the engine the valve members 25 are in the position shown in which the whole of the by-pass air flow is mixed with the hot propulsive gases before being exhausted to atmosphere through the propulsion nozzle 19.

If, during landing of the aircraft, it is necessary to produce a braking effect on the aircraft the valve members 23 are moved to the reverse thrust position and the whole of the hot gases and by-pass air are deflected through the curved vanes 24.

If, for example during take-off, it is necessary to provide additional thrust from the engine, reheat fuel is supplied to the fuel delivery pipes 32 and injected into the hot exhaust gases through the nozzles 33. The valve members 25 are moved by the piston and cylinder devices 29 to the position in which they prevent a flow of by-pass air into the interior of the mixer chutes 21 and allow the by-pass air to flow into the downstream end of the by-pass duct 20 where the by-pass air then flows into the jet pipe 18 through apertures 34 to mix with the reheated exhaust gases.

By injecting the reheat fuel into the exhaust gases upstream of the mixing chutes 21, the stagnant zone immediately downstream of each chute 21 provides stable combustion zones for the burning of the reheat fuel.

It will be appreciated that by using the chutes 21 as flame stabilisers and injecting the reheat fuel through the struts 31 no further reheat equipment is necessary and this also allows the jet deflector means 22 to be located further upstream than would be possible with additional reheat equipment.

Also by allowing the by-pass air to flow into the downstream end of the by-pass duct before mixing it with the exhaust gases the diameter of the jet pipe 18 can be smaller than would be necessary if the whole of the by-pass air and exhaust gases were reheated. The diameter of the jet pipe 18 can then be chosen to be more suitable to the Mach number of the exhaust gases.

Instead of providing a variable nozzle such as the nozzle 19 and instead of providing outlets 34 it may be more desirable to provide the downstream end of the by-pass duct 20 with a rearwardly facing fixed outlet nozzle and to provide a fixed outlet nozzle for the jet pipe 18. In such an arrangement the effective area of the fixed outlet nozzle of the jet pipe 18 would be such as to suit normal engine operating conditions, that is when by-pass air and exhaust gases are mixed in the jet pipe 18. The effective area of the fixed outlet nozzle at the end of the by-pass duct 20 would be such as to suit the engine conditions during reheat, and the degree of reheat would be chosen to suit the fixed nozzle of the jet pipe 18.

The advantage of of such an arrangement is that there would be a saving in weight by having no variable nozzle.

Figure 7:
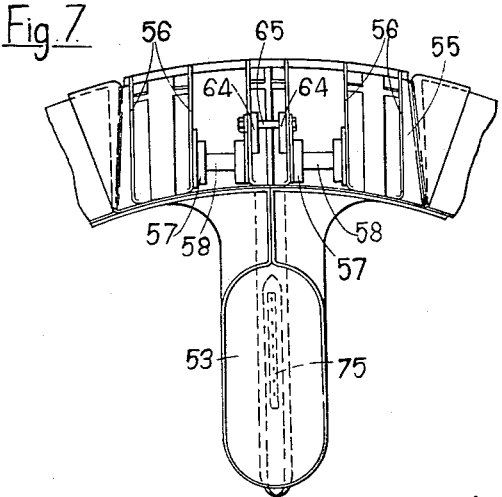
FIGURE 7 is a section taken on the line 7—7 indicated on FIGURE 5 with the operating mechanism omitted.

In the embodiment shown in FIGURES 5 to 7 the by-pass duct 50 is formed by an outer wall 51 and an inner wall 52. Mixer chutes 53 extend radially into the exhaust gas duct 54 and are secured to the inner wall 52 of the by-pass duct 50. Each mixer chute 53 has associated with it an arcuate flap valve 55 which is provided on its upper surface with six radially extending ribs 56. The four ribs 56 which are located in the mid-span region of each flap valve 55 extend beyond the downstream edge of each flap valve 55 and attached to each of the four mid-span ribs 56 are bearing cages 57 which support the ends of pivot pins 58 each of which extend between two of the ribs 56. The pivot pins 58 extend through bores provided in a pivot mounting 59 which is secured to an axially extending ring 60 surrounding and carried by the inner wall 52.

Encircling the flap valves 55 is a frusto-conical ring 61 provided on its inner surface with a number of inwardly radially extending cam plates 62. There is a cam plate 62 associated with each flap valve 55 and each is provided with an inclined slot 63 forming a cam track. Two ribs 56 of each flap valve 55 carry bearings 64 in which are supported the ends of a pin or roller 65 which engages with the inclined slot 63.

The frusto-conical ring 61 is caused to be moved axially within the by-pass duct 50 by having its downstream end connected to the piston rods 66 of a number of piston and cylinder devices 67. The cylinder of each device 67 is pivoted at 68 to a radially extending web 69. Compressed air is supplied to the cylinder of each device 67 by means of conduits 70.

In the position shown in full lines in FIGURE 5 the upstream edge of each flap valve 55 is caused to seat on a sealing ring 71. As will be seen more clearly in FIGURE 7 the adjacent edges of each pair of flap valves 55 are arranged in overlapping relationship.

In operation when it is desired to move each flap valve 55 from the position in which the inlets to the mixer chutes 53 are open to the interior of the by-pass duct 50 to a position in which they are closed, the piston and cylinder devices 67 move the frusto-conical ring 61 to the left, as viewed in the drawings, and the inclined slots 63 act on the rollers 65 causing the flap valves 55 to move about the pivot pins 58 to the closed position.

Upstream of the mixer chutes 53 are a number of struts 72 which support the exhaust cone 73 from the inner wall 52. Surrounding each strut 72 is a sheet metal fairing 74 of aerofoil shape in cross-section. The downstream edge of each fairing 74 is provided with a fuel injector 75 which is supplied with fuel from a conduit 76.

When it is desired to reheat the exhaust gases in order to obtain extra boost, the flap valves 55 are moved to the position in which they close off the inlet to each mixer chute 53 and reheat fuel is injected into the hot propulsive gas stream from the fuel injectors 75. The fuel/gas mixture is ignited in the region of the downstream end of the mixer chutes 53 by catalytic igniters which are indicated at 77.

Downstream of the mixer chutes 53 is a thrust reverser unit 78 similar to the one described with reference to FIGURES 1 to 4.

Instead of pivoting each piston and cylinder device 67 at its downstream end to the web 69 it may be mounted in trunnions extending on each side of it as shown at 79. In such an arrangement the air for operating the device 67 may be supplied through the trunnions 79 thus allowing the thrust reverser unit 78 to be mounted closer to the mixer chutes 53 as shown at 80. This would reduce engine length and give an increased saving in weight.

What we claim is:

1. In a by-pass gas turbine jet reaction engine having an engine casing housing compressor means, combustion equipment, turbine means arranged in series and a jet pipe for the flow of turbine exhaust gases, the improvement comprising: a by-pass duct having its upstream end communicating with the compressor means for receiving a portion of air compressed thereby, said by-pass duct extending past the combustion equipment and turbine means and terminating adjacent the downstream end of said jet pipe; a plurality of mixer chutes each having an upstream end communicating with the by-pass duct and a downstream end extending into the jet pipe downstream of the turbine means; reheat fuel injection means extending into the flow of turbine exhaust gases upstream of said mixer chutes and immediately downstream of said turbine means; valve means adjacent the upstream end of each of said chutes and selectively operable to a first position for allowing by-pass air to flow through said by-pass duct and be discharged from the downstream end thereof adjacent the downstream end of said jet pipe and to a second position for allowing by-pass air to pass into said chutes and be mixed with turbine exhaust gases while preventing flow through said by-pass duct to the downstream end thereof, said mixer chutes being positioned in said jet pipe to act as flame stabilizing means for reheat combustion when said valve means is in said first position.

2. A by-pass gas turbine jet reaction engine as claimed in claim 1 including a fixed outlet nozzle at the downstream end of said jet pipe and including a rearwardly facing fixed outlet nozzle on the downstream end of said by-pass duct adjacent the outlet nozzle of said jet pipe.

3. A by-pass gas turbine jet reaction engine as claimed in claim 1 in which the downstream end of said by-pass duct includes apertures communicating with the interior of the jet pipe adjacent its downstream end through which by-pass air can mix with turbine exhaust gases downstream of the reheat combustion zone.

4. A by-pas gas turbine jet reaction engine as claimed in claim 1 including an exhaust cone immediately downstream of said turbine means, a plurality of struts extending inwardly from the engine casing and supporting said exhaust cone, said struts housing said fuel injection means.

5. A by-pass gas turbine jet reaction engine as claimed in claim 4 in which said struts housing said reheat fuel injection means are in longitudinal alignment with said mixer chutes.

6. A by-pass gas turbine jet reaction engine as claimed in claim 1 including thrust reverser means positioned downstream of said mixer chutes for deflecting turbine exhaust gases to atmosphere in a substantially forward direction.

7. A by-pass gas turbine jet reaction engine as claimed in claim 1 including a pair of side walls extending along the inlet opening of each mixer chute in a downstream direction, said side walls extending between the inner and outer walls of said by-pass duct and converging in a downstream direction to define the box-like chamber, and wherein said valve means includes a pivoted flap valve contained within each box-like chamber between its respective side walls.

8. A by-pass gas turbine jet reaction engine as claimed in claim 7 including piston and cylinder devices positioned in said by-pass duct between side walls of adjacent box-like chambers, said piston and cylinder devices being operatively connected to said flap valves for selectively moving the same between the first position and the second position.

9. A by-pass gas turbine jet reaction engine as claimed in claim 1 in which the valve means associated with each chute comprises an arcuate pivoted flap valve extending circumferentially of said by-pass duct, said arcuate pivot flap valve having its edges overlapping the adjacent arcuate pivot flap valve.

10. A by-pass gas turbine jet reaction engine as claimed in claim 9 including a roller carried on the upper surface of each flap valve, an axially movable ring positioned in said by-pass duct and encircling said flap valves, said ring having an inclined surface for engaging said roller and pivoting the flap valve when the ring is moved axially.

11. A by-pass gas turbine jet reaction engine as claimed in claim 10 including radially extending ribs provided on the outer surface on each of said flap valves, bearing means carried by said ribs, said bearing means supporting said roller.

12. A by-pass gas turbine jet reaction engine as claimed in claim 10 in which said inclined surface on said ring includes a radially inwardly extending cam plate having a slot therein for receiving said roller.

13. A by-pass gas turbine jet reaction engine as claimed in claim 10 including means to axially move said ring, said means including a plurality of piston and cylinder devices positioned in said by-pass duct downstream of the pivots of said flap valves.

14. A by-pass gas turbine jet reaction engine as claimed in claim 1 including means for igniting fuel supplied from said reheat fuel injector means, said means comprising a catalytic igniter.

References Cited in the file of this patent

UNITED STATES PATENTS

| | | |
|---|---|---|
| 2,753,685 | Mattinson | July 10, 1956 |
| 2,933,886 | Sharma | Apr. 26, 1960 |
| 2,934,895 | Gregory et al. | May 3, 1960 |
| 2,964,905 | Hewson et al. | Dec. 20, 1960 |

FOREIGN PATENTS

| | | |
|---|---|---|
| 871,842 | Great Britain | July 5, 1961 |